UNITED STATES PATENT OFFICE.

JOHN M. HICKSON AND DONALD A. YOUNG, OF PORTLAND, OREGON.

PASTE BAIT.

1,384,320.  Specification of Letters Patent.  Patented July 12, 1921.

No Drawing.  Application filed September 27, 1919. Serial No. 326,908.

*To all whom it may concern:*

Be it hereby known that we, JOHN M. HICKSON and DONALD A. YOUNG, citizens of the United States, and residents of Portland, in the county of Multnomah and State of Oregon, have invented a new and useful Paste Bait, of which the following is a specification.

The object of our invention is the production of a plastic composition, or bait, to be applied to a fish hook for the purpose of attracting fish.

Our composition consists of a mixture of salmon eggs, salt, sugar and saltpeter, together with any suitable preservative.

In preparing the composition we prefer to use the ingredients in about the following proportions—viz. one hundred pounds of salmon eggs, from which all membranes and tissues have been removed, five pounds of common salt, one half pound of saltpeter, and one pound of sugar. Good results may be obtained, however, when the ingredients are varied within the following limitations: salmon eggs one hundred pounds, common salt one half pound to five pounds, saltpeter one ounce to one pound, sugar one ounce to five pounds. Either the salt or the sugar may be omitted in some cases, though the composition is not then so efficient as far as curative purposes are concerned, and the attainment of the proper degree of consistency. These ingredients are mixed and compressed together in a manner to form a paste of such consistence as to enable it to be attached to the hook.

Our composition is light in weight inasmuch as a considerable portion of the moisture contained in the eggs is removed in the process of forming the paste. This product milks in the water in a manner similar to that of fresh salmon eggs. It is easy to apply to the hook and adheres better than fresh eggs or any preserved eggs which retain their individual form. Being in the form of a paste it cannot be spilled. It lasts longer than any known form of salmon egg bait, is soluble in water which offers a succulent bait in contrast to the existing bait, which necessarily has an artificial toughening on the surface of each egg. A can of bait lasts a great length of time after having been opened, and in the course of manufacture the moisture that is extracted from the eggs supplies a very valuable by-product which may be used for other purposes.

We prefer to prepare our fish bait in the following manner:—To one hundred pounds of fresh salmon roe from which all surplus membrane has been removed, is added about five pounds of common salt, and the mass is agitated sufficiently to bring the salt in contact with all of the eggs. The action of the salt breaks down the cellular covering of the eggs and extracts a large per cent. of the moisture. A slight mechanical pressure is now applied which is sufficient to remove enough more moisture for the purpose. It should be stated here that when all of the moisture is removed from the eggs mechanically instead of extracting a portion of it by the action of the salt, the cellular structure remains more or less intact and interferes seriously with the converting of the roe into a plastic paste which will dissolve evenly in water. About one-half pound of saltpeter is then added and the mass again thoroughly mixed, and then three pounds of sugar mixed into the mass together with a small portion of suitable preservative, preferably one which does not scent the product too strongly or discolor same.

As before stated, the mass of roe, through the action of the salt, loses its individual forms, which merge upon the application of the slight pressure and form a putty-like paste especially adapted for application to a hook. This, too, is entirely soluble and milks in the water much after the fashion of a fresh egg, except with increased vigor until the entire bait has been dissolved. This milking action of the bait has a two-fold purpose, inasmuch as it disseminates the roe flavor through the water and produces a form of screen for the fishing tackle.

What we claim as new and desire to protect by Letters Patent of the United States, is:

1. A composition paste bait consisting of one hundred pounds of salmon roe, five pounds of common salt, one-half pound of saltpeter, three pounds of sugar and one ounce of preservative.

2. A composition bait consisting of one hundred pounds of fresh salmon eggs previously treated with five pounds of common salt in combination with one-half pound of saltpeter and three pounds of sugar.

3. A method for converting salmon roe into a permanent, attractive, soluble paste bait consisting of treating fresh salmon roe with common salt until the cellular coverings have been weakened and the surplus moisture extracted, then removing as much more moisture as is possible with moderate pressure, then sweetening, curing and preserving the bait in a paste or putty-like form.

4. A method for converting salmon roe into a permanent, attractive, soluble paste bait consisting of treating fresh salmon roe with common salt until the cellular coverings have been weakened and the surplus moisture extracted, then removing as much more moisture as is possible with moderate pressure.

JOHN M. HICKSON.
DONALD A. YOUNG.